United States Patent [19]
Pitts

[11] 4,216,996
[45] Aug. 12, 1980

[54] STABILIZER FOR DUMPING VEHICLES

[76] Inventor: Charlie C. Pitts, 732 Blue Fathom Dr., Bridgeport, Tex. 76026

[21] Appl. No.: 962,378

[22] Filed: Nov. 20, 1978

[51] Int. Cl.³ .............................. B60P 1/16; B60T 7/12
[52] U.S. Cl. ....................................... 298/17 S; 188/29
[58] Field of Search ......................... 298/17 S, 17 SG; 280/6 R, 6 H, 6.1, 6.11; 188/29

[56] References Cited
U.S. PATENT DOCUMENTS

| | | | |
|---|---|---|---|
| 2,684,254 | 7/1954 | Goss | 280/112 A |
| 2,756,062 | 7/1956 | Thixton | 280/6.1 X |
| 2,919,926 | 1/1960 | Schwarz | 188/29 X |
| 3,044,832 | 7/1962 | McManus | 298/17 S |
| 3,331,616 | 7/1967 | Jackson | 280/6 R X |
| 3,640,578 | 2/1972 | Finney | 298/17 S |
| 4,059,942 | 11/1977 | Trimble et al. | 298/17 S X |

FOREIGN PATENT DOCUMENTS 679898  9/1952  United Kingdom .............. 298/17 SG

*Primary Examiner*—L. J. Paperner
*Attorney, Agent, or Firm*—Stephen D. Carver

[57] ABSTRACT

A stabilizer system for a rear dumping vehicle, which system includes an independently operable stabilizing member mounted on each side of the vehicle chassis. Each stabilizing member is urged downward by the ram of a hydraulic cylinder against the tires of the dump body. Hydraulic control is applied to each hydraulic cylinder through a hydraulic conduit which interconnects the respective cylinders with a source of hydraulic pressure. The hydraulic pressure is applied by opening an electrically actuated valve in each conduit. The valves are preferably controlled by limit switches which are actuated by pendulum means oriented to swing transversely of the vehicle chassis. In one arrangement, a manually operated switch operates the hydraulic valves in the conduits to actuate the rams of both cylinders, thereby substantially fixing the position of the chassis with respect to the wheeled rear axle.

2 Claims, 8 Drawing Figures

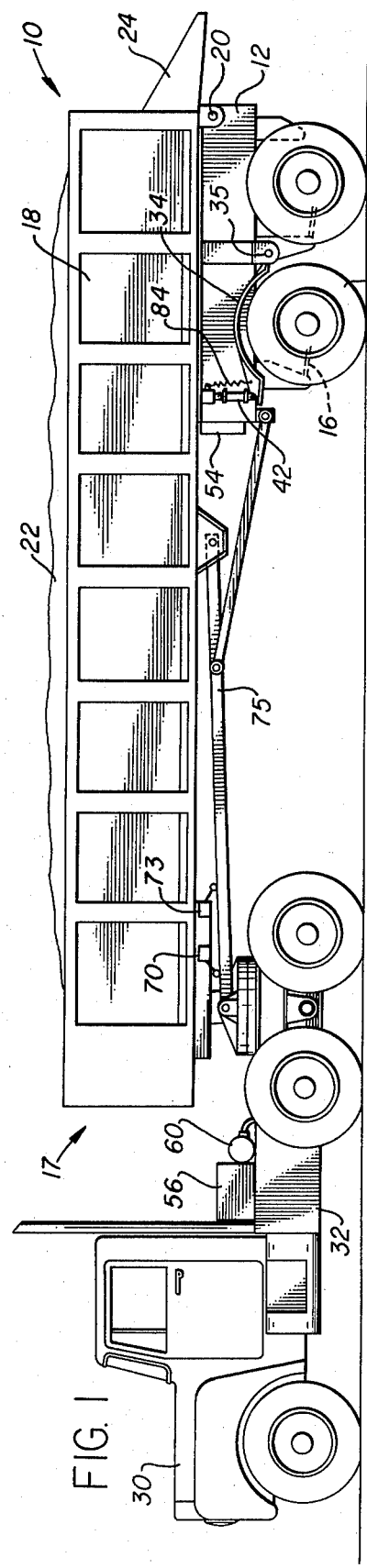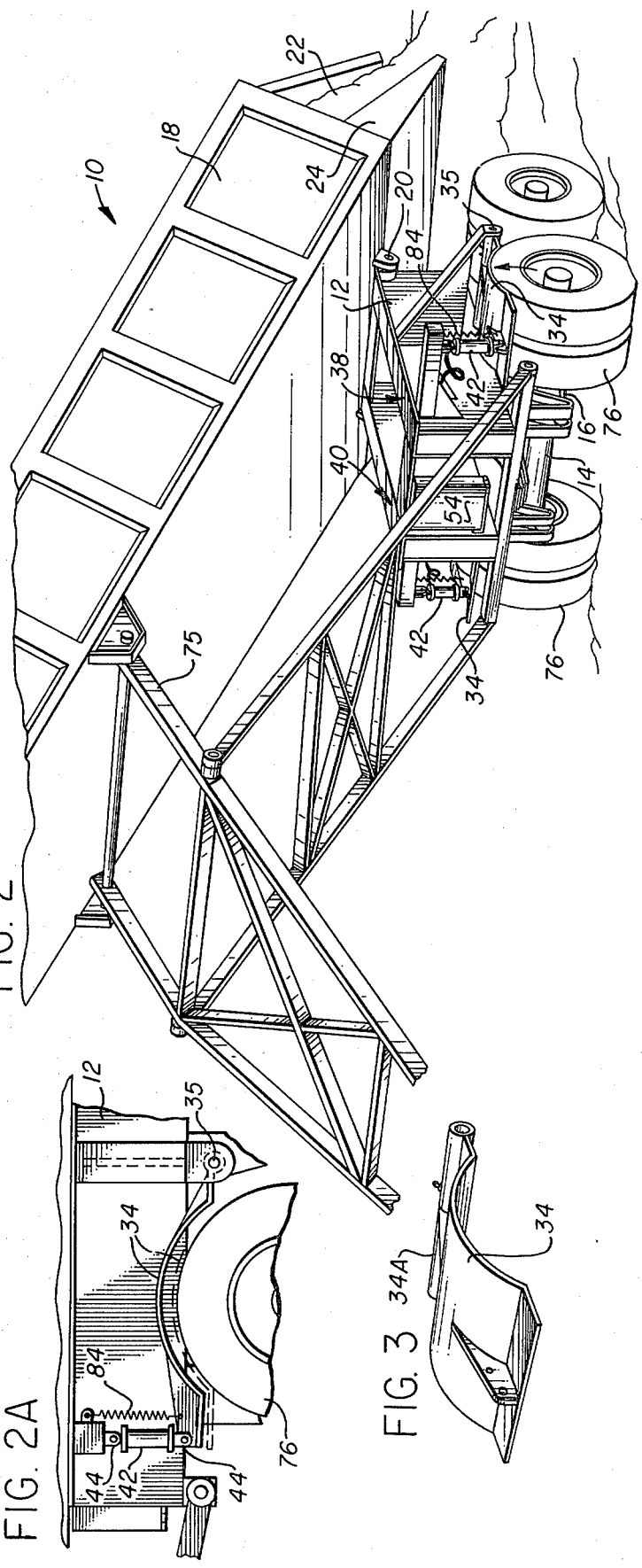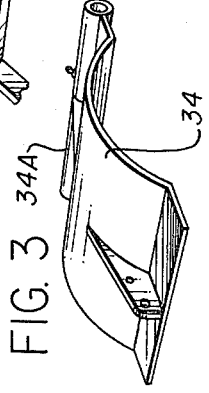

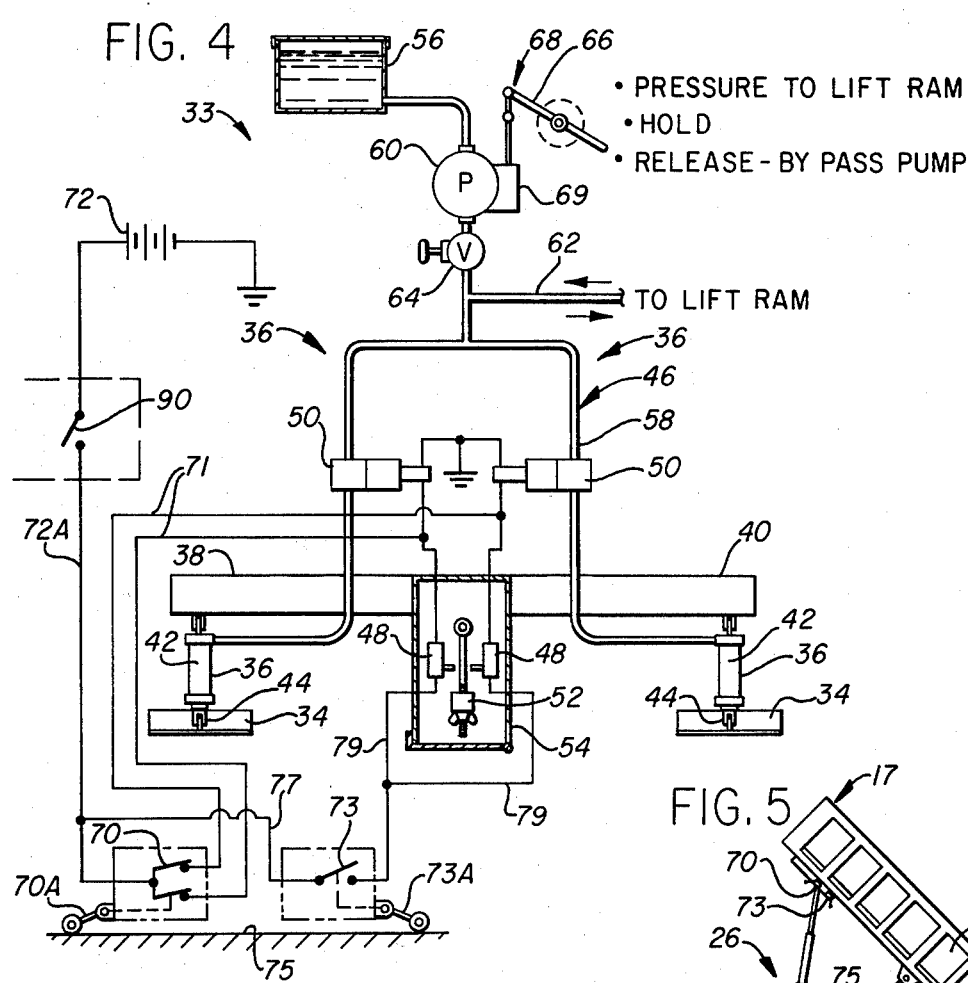
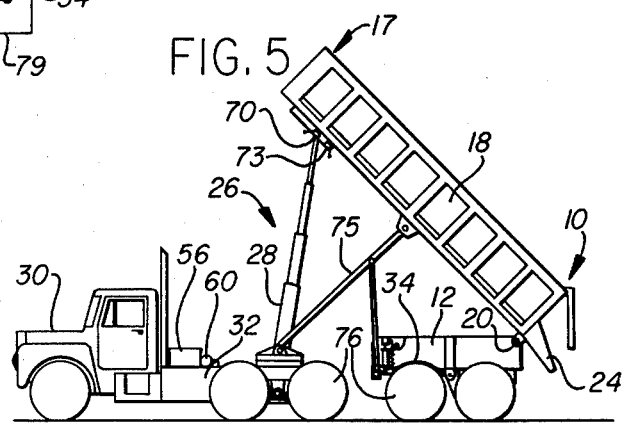
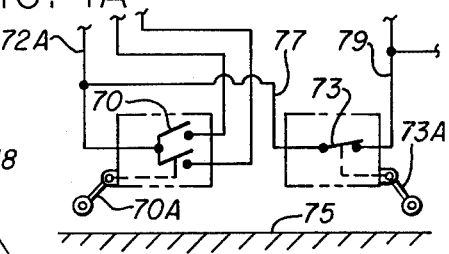
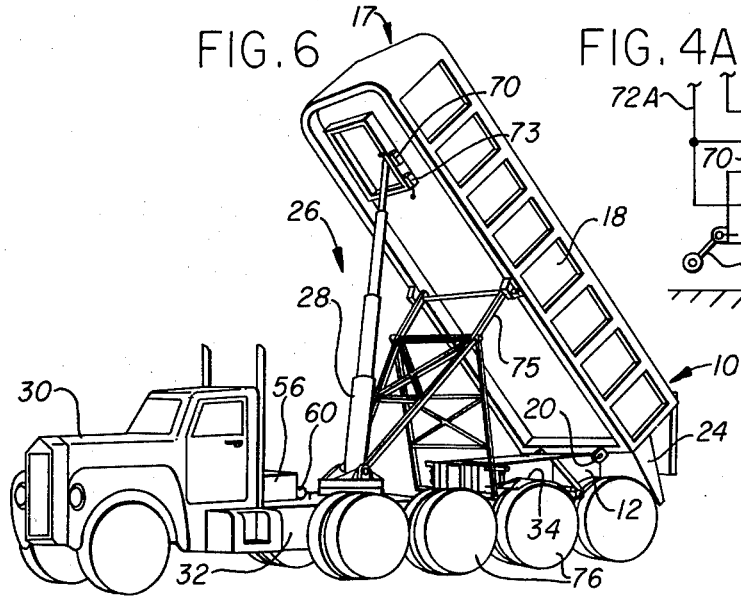

STABILIZER FOR DUMPING VEHICLES

BACKGROUND OF THE INVENTION

This invention relates generally to stabilizers for rear tipping dumping vehicles. More particularly, the instant invention relates to stabilizer apparatus adapted to independently level the lowest side of the dumping vehicle during the unloading operation.

As will be well recognized by those skilled in the art, dumping vehicles comprise a cargo or platform structure pivotally coupled to the chassis frame about an axis substantially parallel to the axle of the rear trailer wheels. A normal rear dumping vehicle has a chassis resiliently supported by at least one rear axle and a dump body pivotally mounted on the chassis. The dump body is pivotally mounted about an axis parallel to at least one rear axle or about the axle itself. Since the chassis is resiliently supported, usually by leaf springs, the chassis and dump body often become unstable when the dump body is being dumped, which is especially true of very long dump bodies, or on laterally sloping terrain. The springs allow the dump body to move laterally with respect to at least one wheeled rear axle. When the load is to be dumped, the platform is raised upwardly so that the load may be deposited at a designated location. However, as the loaded cargo platform is raised, the center of gravity of the dumping unit also rises so that mechanical stability of such unloading vehicles during the dumping operation can be critical. This is particularly true since the wheels of the vehicle seldom rest upon a flat area, and if the terrain or supporting surface is too uneven, tipping of the vehicle may result.

Accordingly, a variety of approaches have been taken in the prior art to stabilize vehicles during the unloading operation. One prior art solution for stabilizing dumping vehicles includes apparatus adapted to lock the rear suspension of the trailer in a predetermined position to prevent tipping as the trailer platform rises. Examples of this concept are shown in U.S. Pat. Nos. 3,778,105; 2,999,721; and 2,662,780. The use of hydraulic piston systems for leveling tilting bodies is shown generally in U.S. Pat. Nos. 3,044,832; 3,083,059 and 2,381,425. U.S. Pat. Nos. 2,829,901; and 3,362,299 disclose multi piston systems whereby truckbeds and the like may be leveled by actuating various control valves. U.S. Pat. No. 3,331,616 discloses a system whereby a vehicle (not a tilting unloading dumping vehicle) may be maintained relatively level automatically as it is loaded with increased weight.

None of the known prior art systems provide a means for automatically leveling the tilt bed of a dumping vehicle in response to an unlevel condition during unloading. Although hydraulic piston arrangements are depicted in the prior art, these must be constantly manipulated by the operator to properly balance the unloading vehicle.

SUMMARY OF THE INVENTION

The present invention is directed to a stabilizer system for rear-tipping vehicles having a chassis resiliently supported by at least one wheeled rear axle and a dump body pivotally mounted on the chassis on an axis parallel to the stabilizing member.

The stabilizing system comprises a stabilizer member mounted on each side of the vehicle chassis. Preferably hydraulic cylinder means associated with each stabilizer member urges the stabilizer member downward against the upper side of the tires of the wheeled rear axle during the raising action of the dump body. The means for urging the stabilizer member downward automatically lifts the lower side of the chassis to effect leveling of the vehicle tilt bed during unloading. Each stabilizing member includes a hydraulic cylinder, the ram of which is urged downward against the stabilizing member when hydraulic pressure is initially applied to the cylinder for raising the dump body.

Hydraulic pressure means applies sufficient pressure to the cylinders to lift one or both sides of the chassis, when one side is low with respect to the other.

Unique pendulum apparatus is provided for automatically sensing and initiating correction of unlevel conditions. On laterally sloping terrain, the weight of the dump body and the load therein is shifted toward the upper side of the rear axle until the pendulum closes a limit switch which causes hydraulic pressure to be directed into the lowest stabilizer cylinder, which will cause the ram and plate to be urged downward against the tires to level the body of the dump vehicle.

This an object of this invention is to provide a hydraulically actuated stabilizer for a dump trailer whereby the tires on the wheels on each side of the rear axle can be held in fixed relation until the initial lifting of the dump body is initiated.

Another object of the invention is to provide an automatic stabilizer for stabilizing the body of a dump trailer during the lifting thereof by the main hydraulic ram.

Still another object of the invention is to provide a leveling device which will automatically level the dump body when hydraulic pressure is impressed upon the hydraulic lift system.

A further object of the invention is to provide a pendulum actuated limit switch which will open hydraulic valves to urge hydraulic rams downward so that plates on the lower ends thereof will engage the tires on the wheels of the rear axle of the dump body to prevent the dump body from tipping when the dumping occurs on laterally sloping terrain.

Yet another object of the invention is to provide an automatic control device for a hydraulic stabilizing system which is simple in construction, low in the cost of manufacture, and which has a minimum of working parts, in view of the job accomplished.

These and other objects and advantages of this invention will appear or become apparent in the course of the following detailed description.

BREIF DESCRIPTION OF THE DRAWINGS

The following drawings, which form a part of the specification, are to be construed in conjunction therewith:

FIG. 1 is a side view of a rear dumping vehicle utilizing the stabilizer according to the instant invention;

FIG. 2 is an enlarged perspective, fragmentary view of the vehicle as shown in FIG. 1, but in dumping position;

FIG. 2A is an enlarged, fragmentary view, taken from FIG. 2, showing the hydraulic cylinders and the tire engaging plates;

FIG. 3 is a perspective view of the tire engaging plate, shown apart from the rest of the invention;

FIG. 4 is a diagrammatic illustration of a stabilizing member for each side of the dump trailer, and showing means associated with each stabilizing member for urging the members downward in accordance with the present invention;

FIG. 4A is an enlarged diagrammatic view, similar to that shown in FIG. 4, but with the dump body being in raised position to open certain valves and to close certain switches, with the switches being shown in opposed relation to the positions illustrated in FIG. 4;

FIG. 5 is a side elevational view showing the dump body in raised position and showing micro-switches thereon for engagement with a movable arm; and FIG. 6 is a perspective view similar to FIG. 5.

DETAILED DESCRIPTION OF THE INVENTION

Referring now to FIGS. 1, 2, 5 and 6, the numeral 10 designates generally a rear dumping vehicle, which utilizes a stabilizer according to the present invention. The chassis 12 of the vehicle 10 is resiliently supported by at least one rear axle 14, by means of conventional leaf springs 16. The vehicle 10 also includes a dump body 18, which dump body is pivotally mounted on the chassis 12 about an axis 20, which axis is parallel to at least one rear axle 14. The dump body 18 is adapted for carrying a load 22, when in the "road" position and for dumping the load 22 through rear chute 24, when in the dumping position, as shown in FIG. 2. The vehicle 10 also includes a hoist 26 including lift ram 28 for raising the forward end 17 of the dump body 18. The vehicle 10 further includes a conventional tractor 30 having a frame 12 on which the hoist 26 is pivotally mounted.

The stabilizer system 33, according to the present invention, included at least one stabilizing member 34 mounted on each side of chassis 12, and actuating means 36 (FIG. 4) for urging each stabilizing member 34 downward against one side of the pair of tires of at least one wheeled rear axle 14, during at least the major portion of the dumping of dump body 18. Actuation means 36 is operable to lift the respective sides of the chassis 12 with respect to one side of the wheeled rear axle 14, when one side of the chassis 12 is lower than the opposite side thereof.

The actuation means 36 comprises in combination, a hydraulic cylinder 42, a ram 44 thereof and means 46 for applying hydraulic pressure to cylinder 42. The ram 44 is urged downward against stabilizing plate member 34, when hydraulic pressure is applied to cylinder 42. Then one side 38 of the chassis 12 is lower than the opposite side 40 of the chassis, then means 46 on the respective sides applies hydraulic pressure sufficient to lift the low side 38 of the chassis 12. Stabilizing member 34 is preferably hingeably mounted along the opposite, tubular end 34A thereof (FIG. 3) via shaft 35.

Means 46 for applying hydraulic pressure to cylinder 42 comprises an electrical circuit which includes limit switch 48, electrically actuated hydraulic valves 50, for controlling hydraulic pressure applied to cylinder 42, and pendulum 52 which is oriented to swing transversely to chassis 12. Electrically actuated valves 50 are responsive to the respective limit switches 48. Actuation of a switch 48 by level sensing means 52 increases the pressure applied to the cylinder 42 to create pressure sufficient to lift the low side of the chassis 12. Level sensing means 52, preferably in the form of a pendulum, is oriented so that it will actuate appropriate limit switch 48, when one side of the chassis 12 is lower than the opposite side thereof. Since pendulum 52 will swing only to one side or the other, depending on which side of the chassis is lower, a single pendulum is sufficient to control both sides of the chassis. Limit switches 48, one for each side of the chassis, and pendulum 52 are all preferably enclosed in a protective cover 54 to prevent damage to the mechanims and to prevent interference with moving parts of other mechanisms.

Means 46 for applying hydraulic pressure to cylinder 42 receives hydraulic fluid from reservoir 56, which is supported by tractor frame 32 via hydraulic conduit 58. The fluid output of pump 60 reaches cylinders 42 via conduit 58 and valves 50. Hydraulic pump 60 also maintains hydraulic pressure for hoist ram 28 through a hoist ram conduit 62. Means 46 further includes a variable control valve 64 in conduit 58, between hoist ram 62 and electrically actuated hydraulic valves 50 to allow for manual adjustment of the pressure applied to cylinders 42 and to allow for any differences in the pressure necessary for hoist ram 28 and rams 44 for hydraulic cylinders 42. The hydraulic pressure applied to pump 60 is adjustable by lever 66 through linkage 68 and valve arrangement 69. Hydraulic pressure normally applied by pump 60 will normally be adjusted to one of three levels: pressure sufficient to lift hoist ram 28, or pressure to hold hoist ram 28 in its current position, or the pressure will be lessened to below what is necessary to hold the ram so that the ram will be lowered by the weight of the dump body 18 and the remainder of the load 22.

Means 46 for applying hydraulic pressure further comprises a switch 70 which is interconnected with hydraulic valves 50 via lines 71 and with battery 72 via line 72A. After dumping, when the tilt bed is moved down to the road position, switch 70 will close, actuating solenoids 50 to release cylinders 42, removing stabilizers 34 from wheel contact.

Therefore, when the tilt body 18 is in the dumping position, switch 70 will be closed when the linkage arm 70A contacts surface 75, thereby substantially fixing the position of the chassis 12 with respect to the tires on at least one wheeled rear axle 14. Switches 70 (one for each of the vehicle sides) are joined together as a double pole switch so that the switches 70 must be actuated together. An off/on switch 90 is also included for deactivating the leveling feature of the stabilizer. Switch 73 is open when the linkage arm 73A contacts surface 75 when the tilt bed 18 is down. When the tilt bed 18 is rising, power will be transmitted through switch 73 to pendulum switches 48 via lines 79. Switch 70 will be "off" at this time (FIG. 4A). Pendulum 52 will thus select and actuate an appropriate switch 48 and thereby a corresponding valve 50 for pressuring a corresponding hydraulic piston 42 during "leveling".

One embodiment of the stabilizer includes a return member, such as a return spring 84 which connects stabilizing member 34 to the chassis 12 for returning stabilizing member 34 to the road position thereof when no longer in use. In a preferred embodiment of the stabilizer, means 36 for urging member 34 downward against the tires of at least one rear wheeled axle comprising a means for urging stabilizing member 34 downward against the tires of at least one wheel 76 of said one side of at least one wheeled rear axle 14. The expression "wheeled rear axle" is used to include the wheels themselves, and the term "wheel" is used to include a wheel, with or without a tire.

It can be seen that when an operator of vehicle 10 stops the vehicle and positions it for the dumping operation, he first closes manually operated switches 70 and permits hydraulic fluid, under pressure, to flow through electrically actuated hydraulic valves 50 to urge ram 44, and thence stabilizing members 34, downward against the tires of wheels 76 with equal pressure, thus giving a stabilizing effect on chassis 12 and dump body 18. The switch 70 then automatically opens and the switch 73 is closed. Upon the vehicle 10 being moved onto angulated terrain, pendulum 52, which is secured to the chassis 12, on the underside thereof, will swing between limit switches 48, and will actuate the limit switch on the side of the chassis which is lowest, whereupon, with switches 73 closed and switches 70 open, hydraulic pressure to the hydraulic cylinder 42, on the lower side, will be increased, thereby further urging stabilizing member 34 on the low side, thus lifting the respective side of the chassis 12 with respect to one side of at least one wheeled rear axle 14. Leveling occurs until that side is no longer lower than the other side, and the pendulum swings back to neutral position, releasing limit switches 48.

At the same time that the telescoping hoist or cylinders 26–28 begin extending, hydraulic pressure is impressed through valves 50 into cylinders 42 to cause stabilizer plate 34 to move downward against tires of wheels 76 on the rear axle of the trailer. In so doing, the dump body is held in fixed relation to the terrain until the pendulum 52 swings into contact with micro limit switches 48, which will cause the hydraulic system to direct hydraulic fluid to the cylinder on the low side of the dump body to cause the dump body to be leveled, whereupon, the telescoping hoist 26–29 will move the body 18 upward to dump the load 22 from the rear end thereof.

A metering valve 64 is positioned within the hydraulic system 62 to restrict the flow of hydraulic fluid, if desired, in one direction, which metering valve is opened when fluid is flowing in the opposite direction so as to prevent the dump body 18 from descending too rapidly. A by-pass valve 69 is positioned to by-pass the pump 60, when desired, or the valve may be positioned to lift the ram 26, hold the ram, or release it in accordance with the positioning of the control lever 66.

It will be seen from the foregoing that the stabilizer apparatus may be actuated by the operation of the switch 90 in the cab. It is further evident that this invention is one well adapted to attain all the ends and objects therin set forth, together with other advantages which are obvious and which are inherent to the structure.

It will be understood that certain features and sub-combinations are of utility and may be employed without reference to other features and sub-combinations. This is contemplated by and is within the scope of the claims.

What is claimed is:

1. A stabilizer system for a rear dumping vehicle having a chassis which is resiliently supported by at least one wheeled rear axle and a dump body pivotally mounted on said chassis about an axis parallel to at least one rear axle, said dump body moveable between road and dump positions, the stabilizer system comprising:

stabilizing plate means mounted on each side of the chassis, said stabilizing plate means pivotally coupled to said chassis and adapted to selectively engage the wheels of one of said wheeled rear axles;

hydraulic cylinder means associated with each of said stabilizing plate means for urging said stabilizing plate means downward into engagement with said wheels during the major portion of the tipping of said dump body;

a source of hydraulic pressure;

solenoid valve means in fluid flow communication with said source for actuating that one of said hydraulic cylinder means associated with the lowest side of said chassis when one side of the chassis is lower than the opposite side of the chassis thereby substantially leveling said chassis;

pendulum level sensing means for actuating the solenoid valve means associated with the hydraulic cylinder means on the lowest side of said chassis; and limit switch means adapted to disable said pendulum sensing means when said dump body is positioned in said road position.

2. The combination as defined in claim 1 including:

spring means extending from said chassis to each of said stabilizing plate means for disengaging said plates from said wheels when said dump body is moved to said road position; and, limit switch means for opening said solenoid valve means whereby to bleed said hydraulic valve means when said dump body is moved to said road position.

* * * * *